Sept. 11, 1962 F. J. WINCHELL 3,053,107
TRANSMISSION CONTROL
Filed June 6, 1957 2 Sheets-Sheet 1
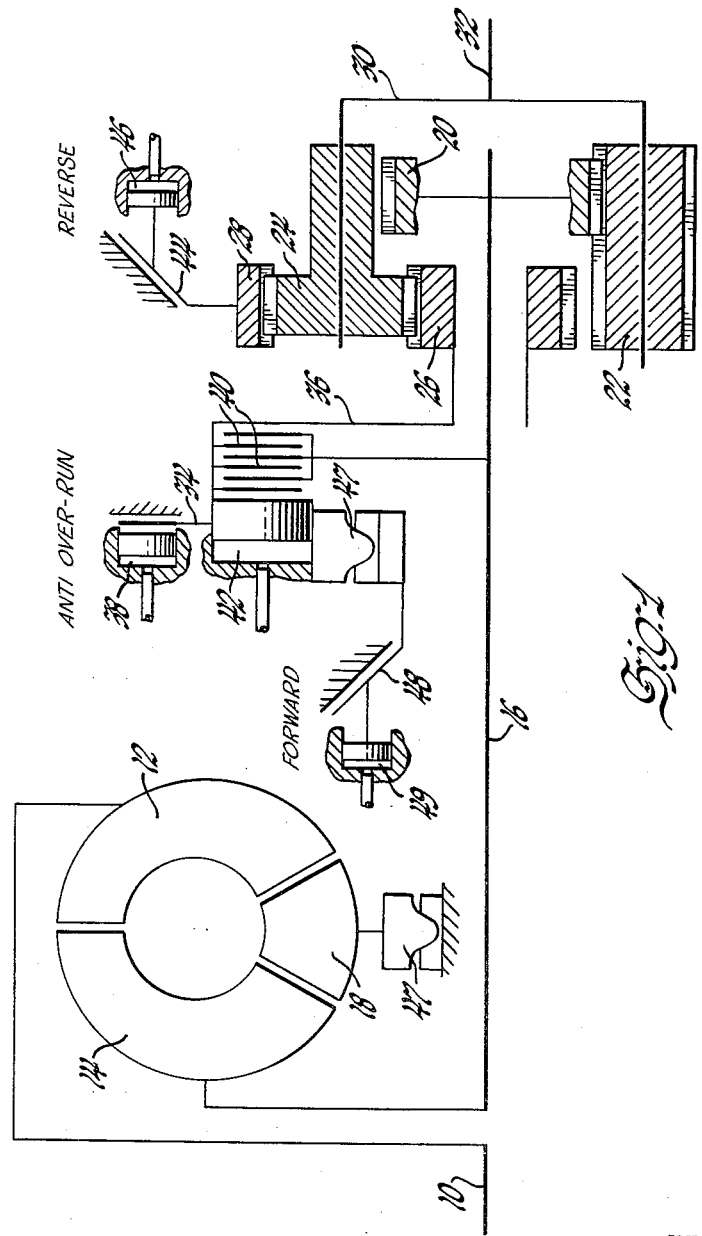
INVENTOR.
Frank J. Winchell
BY
T. L. Chisholm
ATTORNEY

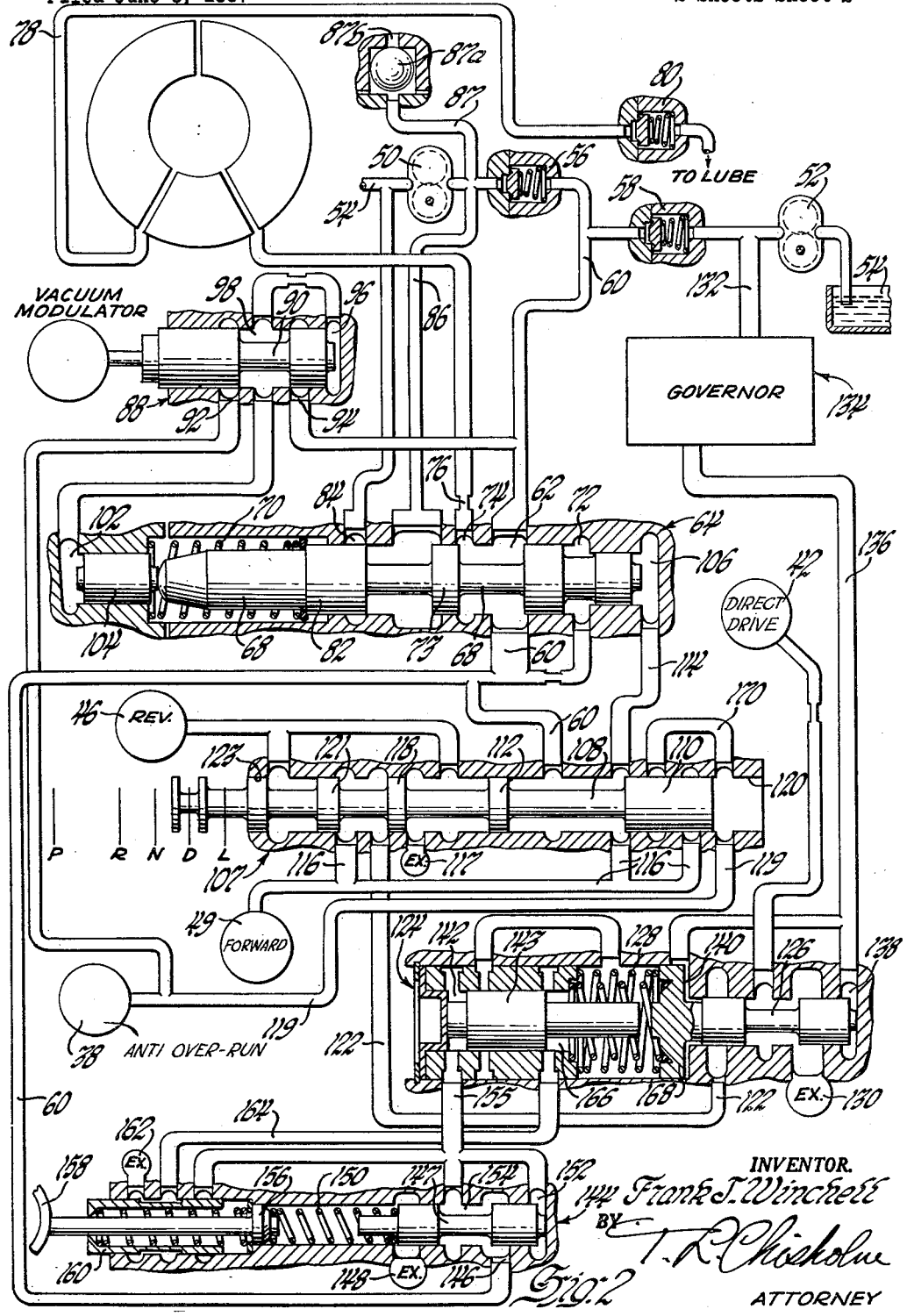

United States Patent Office 3,053,107
Patented Sept. 11, 1962

3,053,107
TRANSMISSION CONTROL
Frank J. Winchell, Bloomfield Hills, Mich., assignor to General Motors Corporation, Detroit, Mich., a corporation of Delaware
Filed June 6, 1957, Ser. No. 663,968
10 Claims. (Cl. 74—472)

This invention relates to change-speed transmissions such as are used for motor vehicles. It is particularly, although not exclusively, suitable for use with hydrodynamic torque converters, and will be described as so applied, but only as an illustration.

The objects of the invention, generally stated, are to improve, simplify and make more reliable the apparatus for controlling such transmissions.

In the drawings:

FIG. 1 is a schematic representation of half of a symmetrical longitudinal section of one form of transmission embodying the invention; and FIG. 2 is a diagram of one form of control apparatus for the transmission of FIGURE 1.

In FIG. 1, the shaft 10 of an internal combustion engine rotates the impeller 12 of any known hydrodynamic torque converter, including a turbine 14 driving a shaft 16, and including a reaction member 18. The torque converter output shaft 16 is the input shaft for the change-speed gearing, so that the engine constitutes a means for driving the gearing.

The shaft 16 drives an input sun gear 20 meshing with a plurality of long planet gears 22, each of which meshes with a short planet gear 24 which in turn meshes both with a forward reaction sun gear 26 and a reverse reaction ring gear 28. The long planets do not mesh with the reaction sun gear nor with the ring gear. All planets are journalled on a carrier 30 connected to the transmission output shaft 32 which may be the propeller shaft of an automobile. When the reaction sun gear 26 is held, as it may be by any suitable torque-establishing device 34 connected to sun gear 26 by a drum 36 and actuated by a fluid pressure cylinder 38, the turbine drives the output shaft 32 forward at reduced speed. When the gear 26 is released but coupled to the sun gear 20, as may be done by any suitable torque-establishing device 40, the planetary gearing is locked up and its input shaft 16 drives its output shaft 32 at the same speed or in direct drive. One side of the torque-establishing device 40 is connected to the drum 36, the other side is connected to the torque converter output shaft 16 and it may be engaged by fluid pressure actuator 42. When the ring gear 28 is held, as it may be by a torque-establishing device 44 engaged by a fluid pressure actuator 46, and the devices 34 and 40 are released, the turbine 14 drives the output shaft 32 backward at reduced speed.

Heretofore, the various definitions of the terms clutch and brake have caused confusion. Some attempts to define the terms have been based on use or function regardless of structure while others have been based on type of structure or arrangement regardless of use or function. This has sometimes led to definitions of clutch and brake being mutually exclusive where they should not be and has led to overlapping definitions where mutual exclusion was intended. None of these definitions which have come to my attention have satisfactorily taken care of the situation in which an identical specimen is sometimes a brake and sometimes a clutch. Neither do they adequately describe a situation in which it is immaterial whether a member is a brake or a clutch, as described by reference to structure, where the significant consideration is the function of the device regardless of its structure.

For this reason I use the generic term torque-establishing device to indicate any device which establishes torque between two parts which at times are relatively rotatable. Thus the term torque-establishing device includes both clutches and brakes and applies to either.

It has been proposed by others to provide control systems for such transmissions which initially hold the reaction sun gear 26 to provide high starting torque, and which release the sun gear 26 and connect it to the gearing input shaft 16 to effect direct drive automatically after the car attains sufficient speed and the load of the engine is sufficiently reduced.

As so far described the transmission is known, and its particular form is immaterial to this invention. Transmissions so constructed have operated satisfactorily within their inherent limitations. However, if the shifting between low speed and direct drive has been smooth and entirely satisfactory this has required expensive and complicated control apparatus, while attempts to simplify the controls have resulted in rough shifting, slipping of clutches and other undesirable results.

This invention has among its objects to provide simple controls which are economical to make and reliable in operation and which effect quick and smooth automatic change of drive ratio in response to the speed of the car and load on the engine; to provide a small and economical transmission which sustains adequate torque under all the varying requirements of operation and more specifically a transmission which has improved and simplified hydraulic or pressure control apparatus which automatically generates high pressure when required to sustain high torque, but which reduces the pressure and hence the power required to maintain the hydraulic control system whenever less torque is required.

In carrying out the invention I use an improved arrangement for holding and releasing the reaction sun gear 26. While forward drive at low speed ratio can be established by engaging the torque-establishing device 34 alone I prefer, for achieving simplicity in timing the release of low speed forward drive and the engagement of direct forward drive, to hold the reaction sun gear 26 by an automatic one-way reaction torque establishing device which prevents reverse rotation to sustain forward drive torque but instantly releases the reaction sun gear when the clutch 40 takes over the torque in establishing direct or high drive. To this end the drum 36, which is connected to the reaction sun gear 26, is provided with a ratchet or freewheel device 47 which may be connected to ground or to the frame of the transmission by a forward drive torque-establishing device 48 which can be engaged by a fluid pressure cylinder 49 whenever it is desired to place the transmission in automatic forward drive by which is meant that the gearing starts in low speed ratio and automatically shifts to high speed ratio, or direct drive. When the torque-establishing device 48 is engaged and the torque-establishing device 34 is released, the turbine 14 tends to rotate the reaction sun gear 26 backward which is prevented by the ratchet 47, but when the torque-establishing device 40 is engaged the torque of the input shaft 16 rotates the sun gear 26 forward at the speed of the shaft 18 which is permitted by the ratchet. The instant the torque on the gear 26 is changed from negative to positive the gear is released, and this effects change of ratio smoothly and without delay or interruption. Consequently, during all forward automatic drive the torque-establishing device 48 remains engaged and torque-establishing device 40 is engaged and disengaged automatically in response to the driving conditions as will be explained. In order to prevent freewheeling of the car in low gear the anti-overrun torque-establishing device 34 is engaged, but this prevents automatic shifting to second or high speed.

Referring to FIG. 2, the control system for operating the above described transmission includes any suitable front pump 50 driven by the engine which can provide oil under pressure whenever the engine is running, and any suitable rear pump 52 connected to the transmission output shaft 32 which provides oil under pressure whenever the car is running forward. The pumps take in oil from a common reservoir or sump 54 and deliver it through check valves 56 and 58 to a common outlet or main line 60 which is connected to a regulated pressure chamber 62 of a main pressure regulator valve generally denoted by 64, and supplies oil for the actuation of the torque-establishing devices. The pressure regulator valve includes a valve stem 68 constantly urged to the right as FIG. 2 is seen by a spring 70 and urged to the left by the pressure of oil in a pressure regulating chamber 72 connected to the main line.

At a predetermined pressure in the main line a land 73 uncovers a converter supply port 74 to supply the torque converter with oil under pressure through a small orifice 76. Oil leaves the converter by a converter discharge line 78 which is controlled by a pressure-responsive relief valve 80 which discharges to the lubrication lines, which discharge to the sump 54. The orifice 76 and the relief valve 80 together maintain a substantially constant static pressure in the converter less than the pressure in the main line and for example 30 pounds per square inch, as is known.

As pressure in the main line increases a land 82 begins to uncover a vent port 84 which permits a front pump discharge conduit 86 connected between the front pump and the check valve 56 to begin to discharge to the sump. If the front pump is operating alone, as it does when the engine is running but the car is standing, this maintains a constant pressure of the front pump, sufficient to operate the system even with the engine idling. This may be, for example 130 pounds per square inch.

If the rear pump is operating alone, as it does when the car is moving forward and the engine is not running, the pressure in chamber 72 moves the valve stem to the left until a land 73 opens communication between chamber 62 and vent port 84 which has already been uncovered by the land 82. This regulates the main line at some constant pressure slightly higher than would be maintained by the front pump, for example 140 pounds. If both pumps are operating, as when the engine is driving the car, then at some predetermined car speed, such as 30 miles per hour, the pressure of the rear pump alone is sufficient to open port 84 fully, so that the front pump discharges to sump through conduit 86. In this event the front pump maintains no pressure and the rear pump supplies all oil required by the system, at the pressure of 140 pounds.

With neither pump running the spring 70 moves valve stem 68 fully to the right, blocking port 74 to prevent draining of oil from the converter. It sometimes happens that when the transmission stands for a long period all oil leaks out of the front pump 50 and the pump becomes air bound. Sometimes when this occurs the pump cannot generate enough air pressure to move the regulator valve enough to open port 74 which would let the air escape into the converter. This may prevent the transmission from starting the car. To prevent this undesirable condition the front pump outlet 86 is provided with an air outlet 87 controlled by a ball valve 87a which can close a vent 87b but is normally held by gravity or by a spring so as to open the vent and permit escape of air from the line 86. As long as the front pump is pumping air, the air escapes through the vent 87b and the pump quickly becomes primed with liquid from the sump. As soon as liquid starts to flow around the ball 87a the oil pressure moves the ball to close the vent 87b and the system fills with oil in the normal manner.

The main pressure regulator valve, as so far described maintains a constant pressure in the main line 60. This means that the regulator valve, as described, and when not influenced by other controls or other variables, maintains a constant line pressure. This is frequently referred to as a regulator valve which tends to maintain, or normally maintains, a constant pressure. Other variable controls are added to the constant pressure regulator valve to vary the pressure which it normally maintains. To vary the pressure with torque demand a second pressure regulator valve or vacuum modulator 88 of known form is used. This includes a valve stem 90 urged toward the right as FIG. 2 is seen, by the force of absolute pressure in the induction manifold of the engine. This tends to close vent port 92 and to open an inlet port 94 connected to the main line 60. The valve stem 90 is urged in the opposite direction to close inlet port 94 and open vent port 92 by the pressure in a pressure regulating chamber 96 connected to a regulated pressure chamber 98 to which oil is admitted by the inlet port 94. This is a known type of regulator valve which constitutes a source of pressure (in the chamber 98) which is measured by the torque or power demand on the engine as indicated by the absolute pressure in the induction manifold. When this pressure is low (vacuum is high) the pressure of oil in the chamber 96 can close the inlet port 94 at a relatively low value. If pressure tends to exceed this value the pressure in chamber 96 moves the valve stem 92 to close the inlet port 94 and crack the exhaust port 92 to relieve pressure; and if the pressure in the chamber 98 falls the absolute pressure in the manifold moves the valve stem to close the exhaust port and crack the inlet port, tending to increase the pressure in chamber 98. Pressure of the chamber 98 is maintained in a first pressure modifying chamber or modulating chamber 102 of the main regulator valve 64, where it tends to increase the pressure of the main line by urging a piston 104 against the valve stem 68 to assist spring 70 in urging the stem 68 to the right. Thus, for any constant torque demand indicated by constant pressure in the modulating chamber 102 the main regulator valve 64 maintains constant pressure in the line 60, but this pressure is modulated or varied as torque demand on the engine changes. The modulator may be set to provide little or no pressure in chamber 102 when the throttle is closed, and to increase the pressure in chamber 102 at wide-open throttle to a value which will increase main line pressure to 255 pounds, for example.

The first, or main pressure regulator valve also includes a second pressure modifying chamber 106 which is a pressure reducing chamber to which main line pressure can be supplied by the selector valve described below to reduce the range of pressure maintained by the regulator valve as influenced by the modulator. Pressure in the reducing chamber 106 urges the valve stem 68 to the left as FIG. 2 is seen, that is toward pressure-reducing position and so bleeds the main line into vent port 84 at a lower pressure than would occur if the chamber 106 were empty, for example 55 pounds at closed throttle. The chamber 106 may be supplied with line pressure during forward drive and may be vented in reverse so that a higher pressure is maintained during reverse drive, as will be explained.

The main line 60 is connected to a first selector valve or manual valve generally designated 107, which includes a valve stem 108 manually positioned to direct oil from the main line to the various clutches for establishing the various drive ratios and ranges of ratios. In normal forward drive or automatic drive the valve stem 108 is positioned at D for drive. This is shown in FIG. 2. Oil from the main line 60 is directed by the groove between lands 110 and 112 to the conduit 114 which fills the pressure-inducing chamber 106 of the main regulator valve 64 to reduce the range of pressure in the main line during forward automatic drive. The forward drive pressure may range from 55 to 100 pounds.

The manual valve also directs oil between the lands 110 and 112 to a conduit 116 leading to the forward chamber 49 to establish low speed drive. The manual valve also vents the reverse chamber 46 by connecting it to an exhaust port 117 by the space between lands 112 and 118 and vents the anti-overrun chamber 38 through the conduit 119 at the exhaust port 120 formed by the open right-hand end of the valve 107.

Automatic shifting between low speed drive and direct drive can be accomplished by the apparatus disclosed in the U.S. Patent 2,766,639, the disclosure of which is incorporated herein by reference and the principal mechanism of which is illustrated in FIG. 2. When the manual valve is in D position oil is conducted from the forward conduit 116 between lands 118 and 121 to a conduit 122 leading to a second selector valve or automatic shift valve generally designated 124 which either supplies oil to the direct drive chamber 42 to establish direct drive or vents this chamber to release direct drive and restore low speed drive. The shift valve includes a valve stem 126 urged to the right, as FIG. 2 is seen, by springs 128. In this position the stem 126 blocks the direct drive conduit 122 and connects the direct drive chamber 42 to an exhaust port 130 as shown in FIG. 2. When the car is running forward the rear pump 52 supplies oil by a conduit 132 to a governor 134 which maintains in a governor delivery conduit 136 a pressure which is a measure of forward car speed. The governor delivery conduit 136 is connected to upshift pressure chambers 138 and 140 in the shift valve 124 which together urge the valve stem 126 to the left, as FIG. 2 is seen, tending to close exhaust conduit 130 and connect the direct drive conduit 122 to the direct drive chamber 42 and thus shift the transmission into high. Shifting into high is opposed by a pressure responsive to torque demand as measured by throttle opening which is maintained in a chamber 142 to urge a piston 143 to the right to assist springs 128 in urging the valve stem 126 to the right or downshifted position.

Pressure in the chamber 142, called throttle valve pressure, is maintained in accordance with throttle opening by a third regulator valve called a throttle valve, designated as a whole by 144, to which oil is supplied from the main line at an inlet port 146. This valve includes a valve stem 147 urged to the right to open the inlet port 146 and close an exhaust port 148 by a spring 150, and urged to the left to open the exhaust port and close the inlet port by the pressure of oil in a pressure-regulating chamber 152 connected to a regulated pressure chamber 154 which is connected by conduit 155 to downshift chamber 142 of the shift valve 124. The force of the spring 150 may be increased by a spring abutment 156 which may be moved to the right, as FIG. 2 is seen, to increase the force of the spring, by any suitable operator 158 connected to the throttle of the engine. This is a known device for maintaining in the chamber 154 and in the chamber 142 connected to it a pressure which is a measure of torque or power demand on the engine. The throttle valve and governor together determine whether the transmission is in low or high forward drive in accordance with the joint effect of the torque demand on the engine and the speed of the car as is known. Thus, when the manual valve is in the D position the forward drive torque-establishing device 49 is always engaged and the direct drive torque-establishing device 42 is engaged to establish high drive or disengaged to establish low drive according to the throttle opening and the speed of the car.

The transmission can be downshifted by moving the arm 158 past wide-open throttle position to move a kickdown sleeve valve 160 to the right to close an exhaust port 162 and connect throttle pressure at the highest value from TV conduit 155 to kickdown conduit 164 to the kickdown chamber 166 at the left of piston 168. This moves the shift valve stem 126 to the right against the highest governor pressure than can exist below some predetermined maximum speed.

When driving at low torque demand, for example after the car has finished accelerating and is maintaining a steady moderate speed on a level road, a relatively low pressure such as 55 pounds is sufficient in the chamber 42 to transmit the torque through the transmission. However, if the torque demand increases as in climbing a hill it may be necessary to hold the torque-establishing device 40 with greater force and this requires increased pressure, for example up to 100 pounds in the chamber 42. This range of pressure is automatically maintained by the main pressure regulator valve 64 due ot the effects of the modulator 88 and chamber 106. Likewise, when the car is accelerating in low gear at low throttle, less pressure is required in the low chamber 49 to hold the reaction sun gear 26 than when the car is accelerating at wide-open throttle. This range of pressures is also maintained by the modulating effect of the chamber 102. This arrangement has the advantage that adequate pressures are instantly available to sustain required torque reaction when demand is high but the pressure of the pumps is reduced when the torque demand is low and this reduces the power required to drive the pumps.

To prevent drive the manual valve is moved one position to the left of that shown in FIG. 2; namely to the N for neutral position, in which the lands 110 and 112 block the main line 60 and the valve stem vents all of the torque-establishing devices. The chamber 49 of the forward torque-establishing device is vented by the conduit 116 at port 120. The chamber 46 of the reverse torque-establishing device is vented at exhaust port 117 by the groove between lands 112 and 118. The direct drive chamber 42 is vented because even if the shift valve 26 should close exhaust port 130 the high clutch supply line 122 is connected by the space between lands 112 and 118 to the exhaust port 117. The anti-overrun chamber 38 remains vented as in automatic drive.

For reverse drive the manual valve is moved two positions to the left of that shown in FIG. 2, namely to the R for reverse position, in which land 112 separates exhaust port 117 from the reverse chamber 46, land 121 blocks the open left end 123 of the valve 107, and the space between lands 110 and 112 supplies oil from the main line to the reverse chamber 46. The forward chamber 49 and anti-overrun chamber 38 remain vented as in neutral at vent port 120 and the high clutch chamber 42 remains vented by connection of the high clutch supply line 122 to the exhaust port 117 through the space between lands 112 and 118. The pressure-reducing chamber 106 is vented by connection of the conduit 114 around land 110 to conduit 116 which is vented at port 120. This maintains a high range of pressure in the main line, for example 140 to 255 pounds.

It is desirable to be able to prevent the transmission from shifting up from low speed forward drive to high speed forward drive. It is also desirable when thus driving continuously in low to prevent the car from freeweeling as it can do when the torque-establishing device 48 alone is engaged. For this purpose the invention uses the torque-establishing device 34 as an anti-overrun torque-establishing device which is engaged by the pressure chamber 38 when and only when the manual valve is moved to the L position for low, which is one position to the right of the D for drive position shown in FIG. 2. When the manual valve is in L position the port 120 is blocked by the land 110 and the anti-overrun chamber 38 is supplied with oil from the main line through the space between lands 110 and 112 and by the passage 170 which leads around the land 110 to the conduit 119. This holds the reaction sun gear 26 positively against movement in either sense of rotation. Also, in this position the manual valve vents the direct drive line 122 at port 117 and vents the reverse chamber 46 at port 123. The valve 107 also supplies the forward chamber 49 by conduit 116 so that forward torque-establishing device 48 is also set. This is to sustain additional torque which may be required when driving in manual low, for example up a severe grade. The anti-overrun torque-establishing device 34 has sufficient capacity to sustain overrun torque but not sufficient to provide a high value of drive torque. It is for this reason that the torque-establishing devices 34 and 48 are both engaged whenever the manual valve is set for manual low. Also, in these conditions it is desirable to remove the modulating effect of the vacuum modulator and maintain high constant line pressure. Consequently, the exhaust port 92 of the vacuum modulator 88 is connected to the conduit 119 which is vented at 120 in all drive positions, except manual low. When this line is vented it permits the modulator to function and maintain in the chamber 102 a pressure responsive to torque demand. However, when the line 119 is supplied with oil at line pressure this causes the vacuum modulator to conduct oil at line pressure to the chamber 102 which balances the pressure in chamber 106 and lets the main pressure regulator maintain a constant pressure of 100 pounds per square inch, for example (reduced from 140 because chamber 106 is filled). Or, if desired, the area of the piston 104 can be greater than the area of the piston in the chamber 106 so that in manual low a higher pressure is maintained than the maximum in automatic drive. This might be, for example, 150 pounds per square inch.

It is noted that the chamber 106 is supplied with oil at main line pressure in all forward drive but is vented in reverse. The modulating chamber 102 is supplied with oil at pressure depending on torque demand in reverse. Consequently, in reverse a higher range of pressures is maintained in the main line, which may be from 140 to 250 pounds per square inch, for example. When in automatic forward drive the pressure level is reduced over that maintained in reverse by filling the chamber 106 and the modulating effect is preserved. However, when in manual low the modulator is disabled by filling the line 164 at line pressure and while the chamber 106 is filled these two pressures balance each other and leave the regulator valve to maintain maximum line pressure without reduction by the chamber 106.

I claim:

1. A transmission comprising in combination means for driving forward and reverse gearing adapted to drive an output shaft, a plurality of fluid pressure devices for establishing forward drive at a plurality of speed ratios and for establishing reverse drive in the gearing, a first source of fluid under pressure, a pressure regulator normally tending to maintain the pressure of the source constant, a second source of fluid under pressure which varies with the torque demand on the driving means, a first fluid pressure chamber which receives fluid from the second source for increasing the pressure maintained by the regulator, a second fluid pressure chamber for decreasing the pressure maintained by the regulator, a selector valve for directing fluid from the first source of pressure selectively to the forward and reverse ratio fluid pressure devices, means responsive to selection of forward drive at each of a plurality of ratios for conducting fluid from the first source to the second chamber and means responsive to direction of fluid from the first source to the reverse actuator for venting the second chamber.

2. A transmission comprising in combination means for driving step ratio forward and reverse gearing adapted to drive an output shaft, at a plurality of forward ratios, a plurality of fluid pressure devices for establishing the various forward ratios and reverse drive in the gearing, a first source of fluid under pressure, a pressure regulator normally tending to maintain the pressure of the source constant, a second source of fluid under pressure which varies with the torque demand on the driving means, a first fluid pressure chamber which receives fluid from the second source for increasing the pressure maintained by the regulator, a second fluid pressure chamber for decreasing the pressure maintained by the regulator, a selector valve for directing fluid from the first source of pressure selectively to the forward and reverse ratio actuators and for preventing direction of fluid from the first source to one of the forward ratio actuators while directing fluid to another of the forward ratio actuators, means responsive to selection of forward drive at a plurality of ratios for conducting fluid from the first source to the second chamber, means responsive to selection of a single forward ratio only for conducting fluid from the first source to the first chamber and means responsive to direction of fluid from the first source to the reverse actuator for venting the second chamber.

3. A transmission comprising in combination means for driving step ratio forward and reverse gearing adapted to drive an output shaft at a plurality of forward ratios, a plurality of fluid pressure devices for establishing the various forward ratios and for establishing reverse drive in the gearing, a first source of fluid under pressure, a pressure regulator normally tending to maintain the pressure of the source constant, a second source of pressure which varies with the torque demand on the driving means, a first fluid pressure chamber which receives fluid from the second source for increasing the pressure maintained by the regulator, a second pressure chamber for decreasing the pressure maintained by the regulator, a selector valve for directing fluid from the first source of pressure selectively to the forward and reverse ratio actuators and for preventing direction of fluid from the first source to one of the forward ratio actuators while directing fluid to another of the forward ratio actuators, means responsive to selection of forward drive at a plurality of ratios for directing fluid from first source to the second chamber and means responsive to selection of a single forward ratio only for directing fluid from the first source to the first chamber.

4. A transmission comprising in combination means for driving forward and reverse gearing adapted to drive an output shaft, a plurality of fluid pressure devices for establishing forward drive at a plurality of ratios and for establishing reverse drive in the gearing, a pump driven by the driving means and which supplies fluid under pressure, a pressure regulator normally tending to maintain the pressure of the pump constant, a modulator which supplies fluid at a pressure which varies with the power demand on the driving means, a modulating fluid pressure chamber which receives fluid from the modulator for increasing the pressure maintained by the regulator in accord with torque demand on the driving means, a fluid pressure reducing chamber for decreasing the pressure maintained by the regulator, a selector valve for directing fluid from the pump selectively to the forward and reverse ratio devices, means responsive to selection of forward drive at each of a plurality of ratios for directing fluid from the pump to the reducing chamber, and means responsive to direction of fluid from the pump to the reverse actuator for venting the reducing chamber.

5. A transmission comprising in combination means for driving step ratio forward and reverse gearing adapted to drive an output shaft at a plurality of forward ratios, a plurality of fluid pressure devices for establishing the various forward ratios and reverse drive in the gearing, a pump driven by the driving means and which supplies fluid under pressure, a pressure regulator normally tending to maintain the pressure of the pump constant, a modulator which supplies fluid at a pressure which varies with the power demand on the driving means, a fluid pressure modulating chamber which receives fluid from the modulator for increasing the pressure maintained by the regulator in accord with the torque demand on the driving means, a fluid pressure reducing chamber for decreasing the pressure maintained by the regulator, a selector valve for directing fluid from the pump selectively to the forward and reverse ratio devices and for preventing direction of fluid from the pump to one of the forward ratio devices while directing fluid to another of the forward ratio devices, means responsive to selection of forward drive at a plurality of ratios for directing fluid from the pump to the reducing chamber, means responsive to selection of a single forward ratio only for directing fluid from the pump to the modulating chamber and means responsive to direction of fluid from the pump to the reverse actuator for venting the reducing chamber.

6. A transmission comprising in combination means for driving step ratio forward and reverse gearing adapted to drive an output shaft at a plurality of forward ratios, a plurality of fluid pressure devices for establishing the various forward ratios and reverse drive in the gearing, a pump which supplies fluid under pressure, a pressure regulator normally tending to maintain the pressure of the pump constant, a modulator which supplies fluid at a pressure which varies with the power demand on the driving means, a fluid pressure modulating chamber which receives fluid from the modulator for increasing the pressure maintained by the regulator in accord with the torque demand on the driving means, a fluid pressure reducing chamber for decreasing the pressure maintained by the regulator, a selector valve for directing fluid from the pump selectively to the forward and reverse ratio actuators and for preventing direction of fluid from the pump to one of the forward ratio actuators while directing fluid to another of the forward ratio actuators, means responsive to selection of forward drive at a plurality of ratios for directing fluid from the pump to the reducing chamber and means responsive to selection of a single forward ratio only for directing fluid from the pump to the modulating chamber.

7. A transmission comprising in combination means adapted to be driven by an engine for driving gearing which selectively drives an output shaft at a plurality of torque-establishing relationships; a plurality of fluid pressure devices each of which establishes drive through the gearing at one relationship; a source of fluid under pressure; a pressure regulator which normally tends to maintain the pressure of the source substantially constant; a fluid pressure modulating chamber which varies the pressure maintained by the regulator; a modulator which supplies a variable control pressure to the modulating chamber, said modulator including a valve chamber having a fluid connection with the modulating chamber and having an inlet adapted to receive fluid from the source and having a vent, a valve in the valve chamber which selectively reduces flow through the vent while increasing flow through the inlet and increases flow through the vent while reducing flow through the inlet, means normally urging the valve to increase flow through the inlet with a force measured by the power demand on the engine, and means responsive to the pressure in the valve chamber for reducing flow through the inlet whereby pressure measured by the power demand is maintained in the valve chamber; means for selectively directing fluid from the source of pressure to the various drive-establishing devices; means responsive to direction of fluid from the source to one drive-establishing device for establishing a fluid connection between the vent and a space having a lower pressure than the pressure in the valve chamber, and means responsive to direction of fluid from the source to another drive-establishing device for preventing flow from the vent to said space and for directing the fluid from the source to the vent.

8. A transmission comprising in combination means adapted to be driven by an engine for driving gearing which selectively drives an output shaft at a plurality of torque-establishing relationships; a first fluid pressure device which establishes one-way drive through the gearing; a second fluid pressure device which establishes two-way drive through the gearing, a source of fluid under pressure; a pressure regulator which normally tends to maintain the pressure of the source substantially constant; a fluid pressure modulating chamber which varies the pressure maintained by the regulator; a modulator which supplies a variable control pressure to the modulating chamber, said modulator having a fluid connection with the modulating chamber and having an inlet adapted to receive fluid from the source and having a vent, a valve in the valve chamber which selectively reduces flow through the vent while increasing flow through the inlet and increases flow through the vent while reducing flow through the inlet, means normally urging the valve to increase flow through the inlet with a force measured by the power demand on the engine, and means responsive to the pressure in the valve chamber for reducing flow through the inlet whereby pressure measured by the power demand is maintained in the valve chamber; means for selectively directing fluid from the source of pressure to the various drive-establishing devices; means responsive to direction of fluid from the source to the one-way drive-establishing device for establishing a fluid connection between the vent to a space having a lower pressure than the pressure in the valve chamber, and means responsive to direction of fluid from the source to the two-way drive-establishing device for preventing flow from the vent to said space and for directing fluid from the source to the vent.

9. A transmission comprising in combination, means for driving step ratio gearing for driving an output member at a plurality of speed ratios, a plurality of fluid pressure devices for establishing a plurality of ratios in the gearing, a source of pressure fluid, a pressure regulator which normally maintains the pressure of the source at one substantially constant value, means responsive to torque demand on the driving means for controlling the regulator to vary the pressure of the source according to torque demand, means responsive to the supplying of pressure fluid to one fluid pressure device which establishes one ratio for increasing the values of varying pressure maintained by the regulator as controlled by the torque demand responsive means, and means responsive to the supplying of pressure fluid to another fluid pressure device which establishes a different ratio for controlling the regulator to maintain a substantially constant pressure different from the pressure normally maintained by the regulator.

10. A transmission comprising in combination, means for driving step ratio forward and reverse gearing for driving an output member at a plurality of speed ratios, a plurality of fluid pressure devices for establishing forward and reverse drive in the gearing, a source of pressure fluid, a pressure regulator which normally maintains the pressure of the source at one substantially constant value, means responsive to torque demand on the driving means for controlling the regulator to vary the pressure of the source according to torque demand, means responsive to the supplying of pressure fluid to one fluid pressure device which establishes reverse drive for increasing the values of varying pressure maintained by the regulator as controlled by the torque demand responsive means, and means responsive to the supplying of pressure fluid to another fluid pressure device which establishes one forward drive ratio for controlling the regulator to maintain a substantially constant pressure different from the pressure normally maintained by the regulator.

References Cited in the file of this patent
UNITED STATES PATENTS

| | | |
|---|---|---|
| 2,645,137 | Roche | July 14, 1953 |
| 2,722,296 | Stoeckicht | Nov. 1, 1955 |
| 2,766,639 | Rosenberger | Oct. 16, 1956 |
| 2,770,148 | Wayman | Nov. 13, 1956 |
| 2,792,716 | Christenson | May 21, 1957 |
| 2,890,605 | Smirl | June 16, 1959 |